United States Patent [19]
Tregay

[11] Patent Number: 4,794,619
[45] Date of Patent: Dec. 27, 1988

[54] OPTICAL FIBER TEMPERATURE SENSOR

[75] Inventor: George W. Tregay, Amherst, N.Y.

[73] Assignee: Conax Buffalo Corporation, Buffalo, N.Y.

[21] Appl. No.: 938,521

[22] Filed: Dec. 5, 1986

[51] Int. Cl.$^4$ .......................... G01J 5/08; G01K 11/00
[52] U.S. Cl. ................................. 374/131; 374/126; 350/96.29
[58] Field of Search ............... 374/130, 131, 126, 161; 356/44; 350/96.29

[56] References Cited

U.S. PATENT DOCUMENTS

| | | | |
|---|---|---|---|
| 3,051,035 | 8/1962 | Root | 374/131 |
| 3,626,758 | 12/1971 | Stewart et al. | 374/131 |
| 4,313,344 | 2/1982 | Brogardh et al. | 374/131 |
| 4,357,106 | 11/1982 | Tschirren et al. | 356/44 |
| 4,362,057 | 12/1982 | Gottlieb et al. | 356/44 |
| 4,468,771 | 8/1984 | Zhukov et al. | 374/131 |
| 4,542,987 | 9/1985 | Hirschfeld | 374/131 |
| 4,560,248 | 12/1985 | Cramp et al. | 350/96.29 |
| 4,576,486 | 3/1986 | Dils | 374/131 |
| 4,592,664 | 6/1986 | Bijlenga et al. | 374/131 |
| 4,616,901 | 10/1986 | MacChesney | 350/96.29 |

FOREIGN PATENT DOCUMENTS 2548779  1/1985  France .................. 374/161

*Primary Examiner*—Steven L. Stephan
*Assistant Examiner*—Thomas B. Will
*Attorney, Agent, or Firm*—Sommer & Sommer

[57] ABSTRACT

A temperature measuring device comprises an optical temperature probe (20) and a control module (21). Thermal emission from a recess (28a, 28b) in the tip end portion (23) of an optical fiber (22) is transmitted to the remote end (26) of the fiber for detection by the control module. The recess provides improved sensor capability with regard to maintaining constant emissivity and rapid response time. The recess is suitable for both single crystal optical fiber and optical fiber with a core-and-cladding construction.

15 Claims, 3 Drawing Sheets

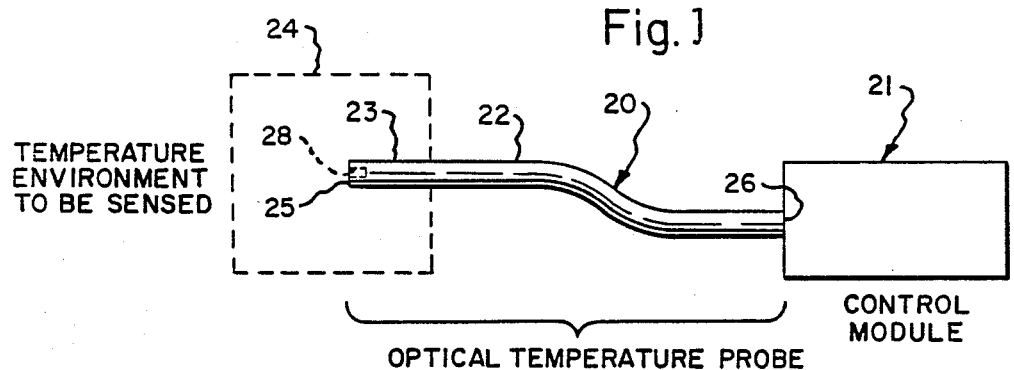
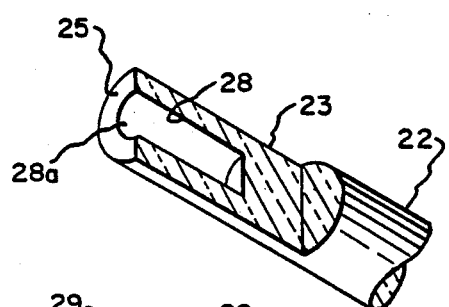 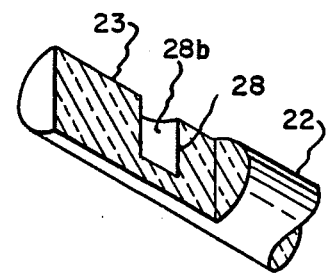
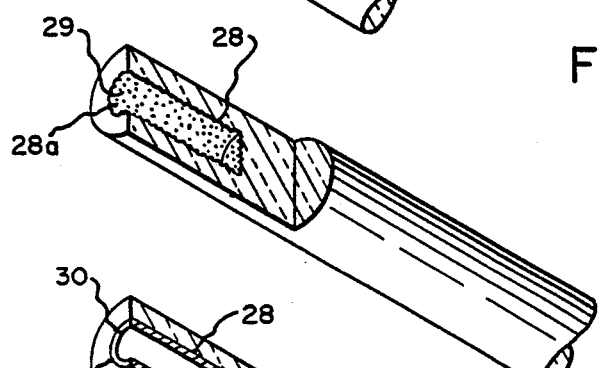
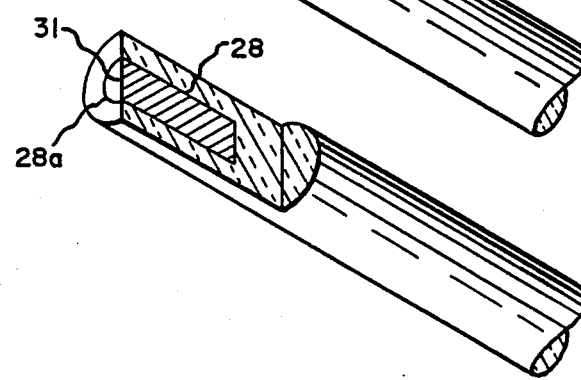

OPTICAL FIBER TEMPERATURE SENSOR

TECHNICAL FIELD

The present invention relates to the field of temperature sensors, and, more particularly, to optical fiber temperature sensors.

BACKGROUND ART

Electrically-based temperature sensors, such as thermocouples and resistive temperature devices (RTD), are commonly used to measure temperature. There are numerous applications in which the response time, accuracy or immunity from electromagnetic interference (EMI) of these electrically-based temperature sensors is inadequate. Fiber optic temperature sensors have been developed with improved response time and accuracy, and the optical fiber is inherently immune to EMI.

It is known to measure temperature with optical means sensitive to thermally-generated optical radiation. The spectral radiance, L, of a thermal radiation source is expressed in optical power (watts) per unit area (square meters), per unit wavelength (meter) and per unit solid angle (steradian). The relationship between spectral radiance, L, and temperature, T, (on the Kelvin scale) of the emitting source is given by the Planck equation:

$$L = \frac{\epsilon C_1}{\lambda^5 [\exp(C_2/\lambda T) - 1]}$$

$\epsilon$ = emissivity
$\lambda$ = wavelength in units of meters
$C_1 = 3.741 \times 10^{-16}$ watt meter$^2$
$C_2 = 0.01439$ meter Kelvin The emissivity, $\epsilon$, is the ratio of the emission efficiency of a source to that of a perfectly-emitting source of the same shape. Emissivity may vary with wavelength. To determine the optical power, P, (in units of watts) collected by an optical fiber, it is necessary to integrate the spectral radiance over the appropriate wavelength interval, $\Delta\lambda$; the effective area, A; and acceptance angle, $\omega$, of the optical fiber:

$$P = \int_{\Delta\lambda} \int_\omega \int_A L(\lambda, T) \, d \cos\theta \, d\omega \, dA$$

where $\theta$ is the angle between the normals of the emitting and receiving surfaces.

For ease of installation, it is known to use a light guide containing one or more optical fibers to transmit the thermal radiation from the sensed region to the optical detector, as shown, for example, in U.S. Pat. No. 1,894,109. In such an arrangement, it is necessary to know the emissivity of the radiation source in order to determine the temperature. For most materials, the emissivity varies with wavelength and also in time due to such effects as oxidation, contamination and mechanical wear. Undetected changes in emissivity introduce errors in optical temperature measurement techniques.

A way to minimize the effects of emissivity changes is to locate an optical cavity in the region for which the temperature is to be sensed. By suitably choosing the shape of the cavity, a change in the emissivity of the interior surface of the cavity will result in a proportionately-smaller change in the effective emissivity of the cavity aperture. When the emissivity of the cavity approaches unity, it is called a blackbody cavity.

The use of blackbody cavities for optical temperature measurement is described in U.S. Pat. Nos. 3,626,758 and 4,576,486. In the latter patent, the blackbody cavity is formed by coating the end of single-crystal optical fiber for a length 20 times the diameter of the fiber. The variation is the effective emissivity of this cavity was less than 1% over a range of test conditions. Accurate temperature measurements can be made as long as the coating is not perturbed. In practice, the coating is eroded in adverse environments. The coating thickness can be increased or additional layers added for protection, but only with a corresponding increase in the response time of the probe. A further limitation of the coating technique is that it can be applied only to the core of the optical fiber, whereas many optical fibers have an annular cladding surrounding the core as an integral part of the fiber. A further limitation of U.S. Pat. No. 4,576,486 is that the temperature range does not extend below 500° C.

Another example of an optical temperature sensor is disclosed in U.S. Pat. No. 4,362,057. The thermal radiation from an optical fiber itself is employed to make a temperature sensor. Even transparent materials such as glass have a finite emissivity in the near-infrared, producing thermal radiation above 100° C. This self-generated radiation can be detected at the remote end of the fiber and suitable electronics used to convert an optical signal level to a temperature. This approach is applicable to the measurement of temperature over a region having dimensions of inches or feet, but is not suitable for smaller regions.

Improvements to the ruggedness, response time, usable type of optical fibers, temperature range, and spatial resolution of optical temperature sensors, achieved by the present invention, renders them capable of exploitation for temperature sensing and measurement in such industrial applications as combustion systems, petroleum and chemical processing, and locations with high electromagnetic fields.

DISCLOSURE OF INVENTION

According to the present invention, the temperature sensor apparatus comprises an optical temperature probe and a control module. The optical temperature probe contains an optical fiber with a tip end located in the temperature environment to be sensed and a remote end connected to a control module. The optical fiber in the vicinity of said tip end is made to have a recess containing a thermally-emissive surface. The emissive surface generates optical radiation in proportion to its temperature and the control module has the means to convert the measured optical power to a signal proportional to temperature.

An important feature of the present invention is that the emissive source is located within the optical fiber. Thus, the fiber itself protects the emissive surface and thereby maintains the emissivity of the surface at a fixed value. By using the probe configuration of the present inventive apparatus to keep the emissivity constant over time, it is not necessary to form a blackbody cavity.

The thermally-emissive surface is positioned near the tip end of the optical fiber by drilling or otherwise creating a recess near the end of the fiber. The thermal-emissivity characteristic of this surface must be greater than the thermal-emissivity characteristic of the optical fiber. The emissive surface can be prepared by increasing the emissivity of the optical fiber material, for example, by roughening. Alternatively, the emissivity of the recess region can be increased by bringing a different material in contact with the surface of the recess. For example, the recess can be coated with a thin film, or the recess filled with an insert. The materials used in the recess are selected to be compatible with the temperature range and environment in which the probe is to be used.

Glass is usable as an optical fiber at temperatures up to 600° C. and is resistive to many chemicals. Quartz optical fibers are similar to glass in chemical resistance and can be used up to 1000° C. Sapphire is an optical material with an operating temperature range up to 2000° C., and is well known for its hardness and resistance to chemical attack. For an optical fiber having a core-and-cladding construction, the recess, if axial, should be smaller than the central core of the fiber. The thermal emission generated at the surface of the recess and within the acceptance angle of the core will be propagated down the fiber.

The control module employs techniques similar to those described in the literature such as, for example, U.S. Pat. Nos. 4,362,057 and 4,576,486. Optical power detectors made from materials such as silicon, germanium, aluminum-gallium arsenide or lead sulfide can be selected, based on their sensitivity to the spectral distribution of optical power at the desired temperature range. The electric voltage produced by the optical power detector is measured and the control module includes the means to convert the optical signal level to an output proportional to temperature.

Accordingly, the general object of the present invention is to provide an improved optical fiber temperature sensor which has fast response time and simultaneously is rugged enough to withstand hostile environments.

It is a further object to configure the thermal emission source for use with either optical fiber made from a single-crystal, such as sapphire, or an optical fiber having a core-and-cladding construction made from glass or quartz.

It is a further object to localize to a small region the volume in which the temperature is sensed.

It is a further object to allow the probe to be made of all dielectric materials so that the probe may be used near high voltage equipment and in areas containing strong electromagnetic fields.

It is a further object to make the sensor cost effective, easy to manufacture, and capable of measuring temperature in the range of from 175° C. to 2000° C.

Other objects and advantages of the present invention will be apparent from the foregoing and ensuing detailed description, the drawings, and the appended claims.

BRIEF DESCRIPTION OF DRAWINGS

FIG. 1 is a schematic representation of an optical fiber temperature sensor apparatus embodying the present invention associated with a temperature environment to be sensed.

FIG. 2 is an enlarged fragmentary perspective view of the temperature-sensing tip end portion of the optical fiber shown in FIG. 1, partly in section, and showing a thermally-emissive surface provided by an axial recess at such tip end.

FIG. 3 is a view similar to FIG. 2, showing another form of thermally-emissive surface provided by a radial recess at the tip end of the optical fiber.

FIG. 4 is a view similar to FIG. 2, showing the wall of the recess roughened.

FIG. 5 is a view similar to FIG. 2, showing the recess coated with a thin film.

FIG. 6 is a view similar to FIG. 2, showing the recess filled with an insert.

MODE(S) FOR CARRYING OUT THE INVENTION

Figure 7:
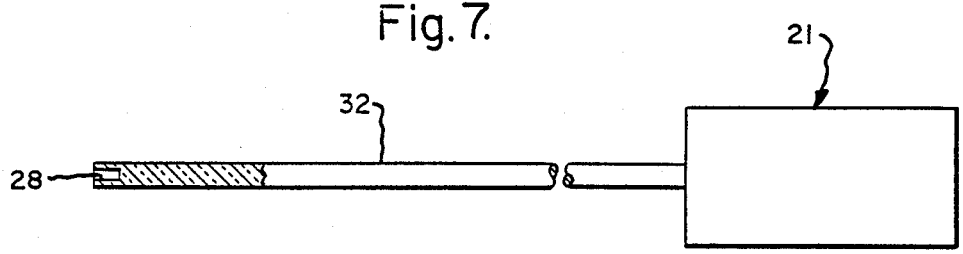
FIG. 7 is one species of sensor apparatus depicted in FIG. 1, partly in section, and showing the optical fiber as a single filament.

Embodiments of the optical fiber temperature sensor apparatus, with its species variations, are illustrated in the drawings.

Referring to FIG. 1, the apparatus is shown as comprising a probe 20 and a control module 21. The probe includes an optical fiber element 22 having a tip end portion 23 for insertion into a region where temperature is to be detected, such region being indicated in FIG. 1 by broken lines and represented generally by the numeral 24. End portion 23 has an end face or tip 25. The opposite or remote end 26 of optical fiber element 22 is operatively connected to control module 21, as will be explained later herein. Between fiber ends 25 and 26, the optical fiber element 22 provides a radiant energy transmission path.

Within region 24, the tip end portion 23 of the optical fiber element 22 includes means providing a thermally-emissive surface, represented generally by the numeral 28 in FIG. 1, which is internal to the aforementioned radiant energy path. This emissive surface 28 has a thermal-emissivity characteristic higher than that of the optical fiber element 22, and generates thermal radiation in proportion to the temperature of such emitting surface. This radiation is transmitted along a path within optical fiber element 22 from tip end 23 to the control module 21 located at remote end 26. Control module 21 includes the means to measure the optical power and produce an output proportional to the temperature of the emissive surface 28. This output may be an analog electrical signal, a digital electrical signal or a visual temperature display, any of which is well understood by those skilled in the art.

Illustrative configurations of the temperature probe tip end portion 23 are shown In FIGS. 2 and 3. In FIG. 2, emissive surface 28 is shown as provided by the peripheral wall of an axially-disposed, central, cylindrical recess 28a opening to the tip or end face 25 of the optical fiber element. Alternatively, surface 28 may be provided by the peripheral wall of a radially-disposed cylindrical recess 28b, as shown in FIG. 3. In either case, the surface forming the boundary defining the wall of the recess 28a or 28b is made to have a higher thermal emissivity than the optical fiber element 22. It is to be understood that the recess providing the emissive surface 28 may be other than cylindrical, such as conical.

The emissive surface 28 can be provided by roughening the surface of the recess so as to have a higher emissivity than the optical fiber, or coating the recess surface with a material having a higher emissivity than the optical fiber, or filling the recess with a refractory element or compound having a greater emissivity than the optical fiber. Examples of a suitable refractory material include oxides of aluminum, silicon, zirconium and yttrium.

These alternative arrangements are illustrated in FIGS. 4–6 for the axial recess 28a shown in FIG. 2. In FIG. 4, this axial recess is shown as having a roughened surface 29. In FIG. 5, the axial recess 28a is shown as lined with a coating 30. In FIG. 6, the axial recess 28a is shown as filled with an insert 31. In these variations, the emissive surface 28 is provided by the roughened surface 29 in FIG. 4; by the outer peripheral surface of the coating 30 in FIG. 5; and by the outer peripheral surface of the insert 31 in FIG. 6.

The radial recess 28b shown in FIG. 3 may be similarly provided with a roughened surface, or a coating, or an insert, as illustrated in FIGS. 4–6. In order to avoid a redundancy of illustrations, such variations for radial recess 28b have not been depicted.

Figure 8:
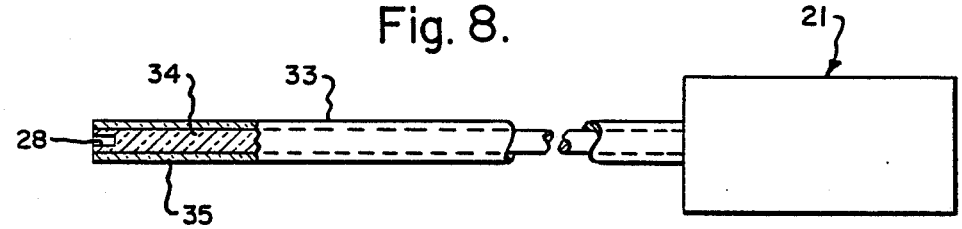
FIG. 8 is another species of sensor apparatus depicted in FIG. 1, partly in section, and showing the optical fiber as having a core-and-cladding.
Figure 9:
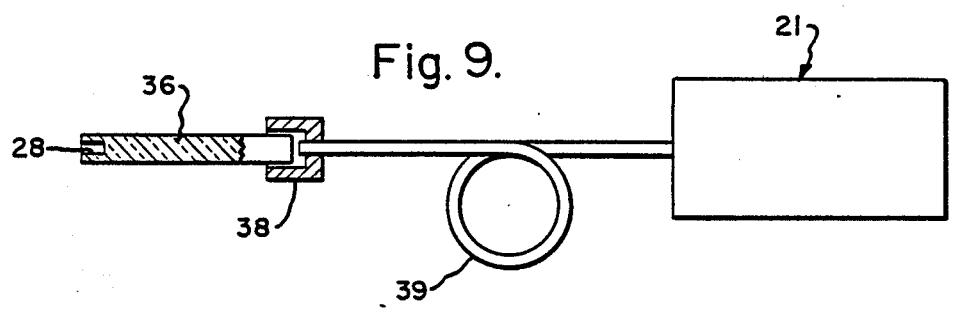
FIG. 9 is still another species of sensor apparatus depicted in FIG. 1, partly in section, and showing the optical fiber element as including a high-temperature section optically coupled to a low-temperature section.

The optical fiber element 22 (FIG. 1) can be a light guide 32 made of a single material, as shown in FIG. 7. In FIG. 8, the light guide 33 is shown as constructed with a core 34 surrounded by a cladding 35. Where high temperature operation is desired, say, in the range of from 1000° C. to 2000° C., it is necessary to use a crystalline material with a high melting point, such as sapphire. A length of rigid optical-quality sapphire is shown at 36 in FIG. 9, and for ease of installation it can be joined by a suitable optical connector 38 to a flexible section of optical fiber 39 outside the high temperature region.

Figure 10:
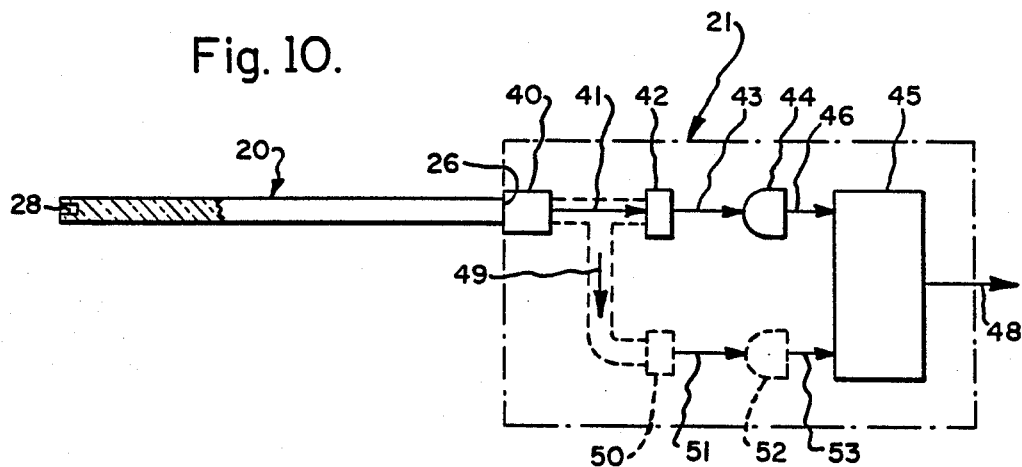
FIG. 10 is a view similar to FIG. 7, and showing details, schematically, of the control module.

The control module 21 includes means to measure the optical power at the remote end 26 of the optical fiber element 22, and convert the measured value to an output signal proportional to the temperature of the thermally-emissive surface 28. Referring to FIG. 10, the control module 21 is shown as being operatively joined to the optical temperature probe 20 by a suitable connector 40. While the control module 21 may be variously constructed, it is shown as including means, represented by the arrow 41, to convey the optical radiation to an optical filter 42 which has a spectral bandpass centered at wavelength $\lambda_1$. This filter is used to control the wavelength range of the radiant energy transmitted via the path, represented by the arrow 43, to the optical power detector 44. This detector produces a voltage, $V_1$, proportional to the optical power striking its photosensitive surface. This voltage is transferred to a signal processor 45 via suitable means, indicated generally at 46. This signal processor converts voltage $V_1$ to an output signal, represented at 48, which is proportional to the temperature of emissive surface 28.

For some applications, greater accuracy can be achieved by measuring the optical power in two wavelength intervals, as also illustrated in FIG. 10. Within the control module 21, the optical radiation is split into two beams, the second of which is represented by the arrow 49. This second beam passes through a second filter 50 with a spectral bandpass centered at wavelength $\lambda_2$, and is transmitted via path 51 to a second optical power detector 52, thus producing a second voltage, $V_2$, which is conveyed via suitable means indicated at 53 to signal processor 45. Techniques for using optical measurements at two wavelengths are known by those skilled in the art, and are described in U.S. Pat. No. 4,362,057, for example.

Figure 11:
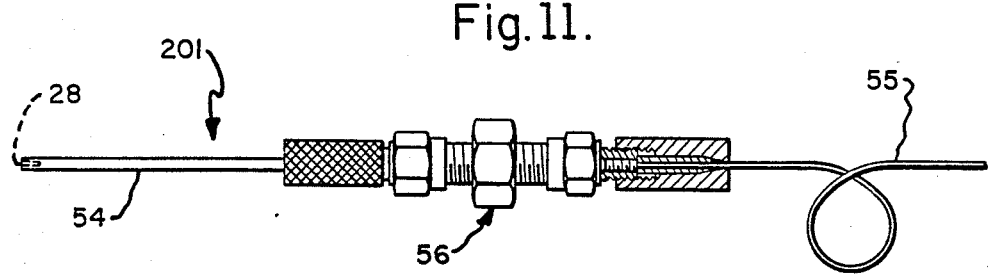
FIG. 11 is a depiction of a sapphire optical fiber connected to a flexible optical fiber by a commercial form of connector, illustrated partly in section.

A probe geometry suitable for general use is illustrated in FIG. 11, and represented by the numeral 201. There the probe 201 is shown as including a high-temperature optical fiber section 54 and a low-temperature optical fiber section 55, connected together by an optical fiber connector 56 of any suitable construction.

Figure 12:
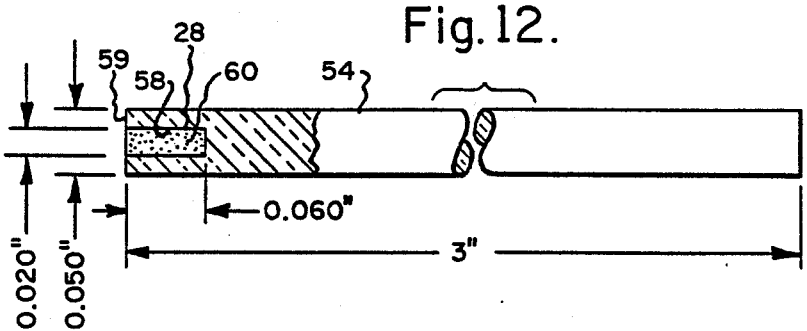
FIG. 12 is a side elevational view, partly in section, of the sapphire optical fiber shown in FIG. 11, in which the tip end is provided with an axial recess having the dimensions indicated, and filled with a zirconia powder insert.

Referring to FIG. 12, the high temperature optical fiber section 54 is represented by a sapphire rod having a diameter of 0.050 inch [1.27 millimeters (mm)] and a length of 3 inches (76.2 mm). Located in the tip end of this sapphire optical fiber 54 is a cylindrical recess 58 in the form of a centrally-disposed axial recess, opening to the tip end face 59. Recess 58 has a 0.020 inch (0.508 mm) diameter and 0.060 (1.524 mm) inch depth. These small dimensions of the optical fiber 54 and recess 58 allow the probe to rapidly equilibrate with its temperature environment. Recess 58 is preferably filled with a refractory powder 60, such as Zircar ZYBF-2 powder (92% zirconium oxide and 8% yttrium oxide), manufactured by ZIRCAR Products Inc. The outer periphery of insert 60 provides thermally-emissive surface 28.

The low-temperature optical fiber section 55 may be made of glass, provided with a core having a diameter of 200 microns (0.0079 inch) and a cladding having an outer diameter of 240 microns (0.0094 inch).

A connector 56 suitable for joining the two optical fiber sections 54 and 55 is described in U.S. Pat. No. 4,607,911, owned by the assignee of the present application. The description of the connector in said U.S. Pat. No. 4,607,911, is incorporated herein by reference.

Figure 13:
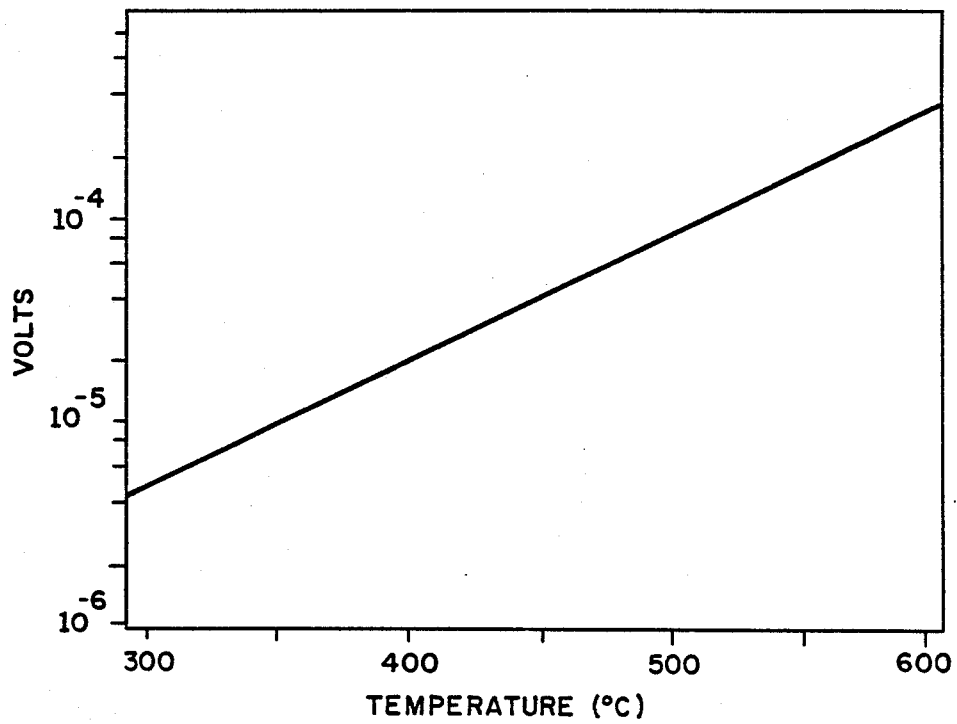
FIG. 13 is a graph plotting temperature sensed by the sapphire optical fiber shown in FIG. 12, versus volts produced by a germanium detector.

The optical power transmitted by the probe 201 shown in FIG. 11 is preferably measured by a germanium photodetector. The electrical signal in volts produced by such a photodetector is shown in FIG. 13 as a function of the temperature surrounding the tip end portion of the sapphire probe 54.

While embodiments of the inventive improvement have been shown and described, persons skilled in the art will readily appreciate that various modifications besides those mentioned may be made without departing from the spirit of the invention, as defined and differentiated by the following claims.

I claim:
1. A temperature measuring device, consisting of:
 an optical fiber element having a tip end portion for insertion into a region wherein temperature is to be measured and having a remote end, said element providing a path for transmission of radiant power between said tip end portion and said remote end;
 thermally-emissive means extending into said tip end portion from an outer surface thereof to provide a thermally-emissive surface internal to said transmission path, said emissive surface having a thermal-emissivity characteristic higher than that of said optical fiber element; and detector means disposed at the remote end of said element for producing an electrical signal which varies as a function of the magnitude of radiant power transmitted along said path.

2. A temperature measuring device according to claim 1 wherein said thermally-emissive means includes a recess and an insert of thermal-emissive material arranged in said recess, said material having a thermal-emissivity characteristic higher than that of said optical fiber element.

3. A temperature measuring device according to claim 2 wherein said emissive insert fills said recess.

4. A temperature measuring device according to claim 2 wherein said recess has a wall and said emissive insert lines said wall.

5. A temperature measuring device according to claim 1 wherein said thermally-emissive means includes a recess having a wall possessing a thermal-emissivity characteristic higher than that of said optical fiber element.

6. A temperature measuring device according to claim 5 wherein said wall is roughened to increase its emissivity.

7. A temperature measuring device according to claim 3, 4, 5 or 6 wherein said recess is arranged generally axially of said tip end portion.

8. A temperature measuring device according to claim 3, 4, 5 or 6 wherein said recess is arranged generally radially of said tip end portion.

9. A temperature measuring device according to claim 2 wherein said emissive insert is a refractory element.

10. A temperature measuring device according to claim 2 wherein said emissive insert is a refractory compound.

11. A temperature measuring device according to claim 1 wherein said optical fiber element is composed of glass.

12. A temperature measuring device according to claim 1 wherein said optical fiber element is composed of quartz.

13. A temperature measuring device according to claim 1 wherein said optical fiber element is composed of sapphire.

14. A temperature measuring device according to claim 1 wherein said optical fiber element includes a first section operable at a high temperature and a second section operable at a lower temperature.

15. A temperature measuring device according to claim 1 wherein the device is capable of measuring temperature in the range of from 175° C. to 2000° C.

* * * * *